(12) United States Patent
Lemak

(10) Patent No.: US 7,219,673 B2
(45) Date of Patent: May 22, 2007

(54) TRANSFORMERLESS MULTI-LEVEL POWER CONVERTER

(75) Inventor: Thomas A. Lemak, McKeesport, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 0 days.

(21) Appl. No.: 10/927,327

(22) Filed: Aug. 25, 2004

(65) Prior Publication Data

US 2006/0044857 A1 Mar. 2, 2006

(51) Int. Cl.
*H02M 7/48* (2006.01)

(52) U.S. Cl. ............................ 132/71; 363/132; 363/98

(58) Field of Classification Search ............ 363/37–44, 363/98, 132, 97, 65, 67, 56, 71; 318/801, 318/811, 139, 496
See application file for complete search history.

(56) References Cited

U.S. PATENT DOCUMENTS

| | | | |
|---|---|---|---|
| 4,203,151 A | | 5/1980 | Baker |
| 4,270,163 A | | 5/1981 | Baker |
| 4,484,127 A | * | 11/1984 | Salihi et al. ............... 318/802 |
| 4,484,257 A | | 11/1984 | Sugimoto |
| 4,661,714 A | | 4/1987 | Satterthwaite et al. |
| 5,155,675 A | | 10/1992 | Maruyama et al. |
| 5,270,913 A | | 12/1993 | Limpaecher |
| 5,684,690 A | | 11/1997 | Levedahl |
| 5,841,645 A | | 11/1998 | Sato |
| 5,933,339 A | | 8/1999 | Duba et al. |
| 6,016,262 A | | 1/2000 | Karlsson |
| 6,058,031 A | * | 5/2000 | Lyons et al. .................. 363/67 |
| 6,150,731 A | | 11/2000 | Rinaldi et al. |
| 6,175,163 B1 | | 1/2001 | Rinaldi et al. |
| 6,592,412 B1 | * | 7/2003 | Geil et al. ..................... 440/6 |

FOREIGN PATENT DOCUMENTS

DE G 9301877-0 U1 3/1994

OTHER PUBLICATIONS

Wasynczuik, O. et al., Modeling a Six-Phase Electric Drive System With a Low-Speed/Reversing Control Strategy, date and publication unknown, pp. 633-638, no date.

* cited by examiner

*Primary Examiner*—Rajnikant B. Patel
(74) *Attorney, Agent, or Firm*—Reed Smith LLP

(57) ABSTRACT

The cascaded, multi-level inverter can be found in a variety of applications and in a variety of industries. The inverter is typically used as a motor drive to provide variable voltage and variable frequency to a propulsion motor or other loads requiring variable frequency and voltage. In the present invention, the transformer is eliminated and its function included in an existing generator by adding a plurality of secondary windings to supply the isolated voltages needed by the multi-level power converter. Two specific examples of the present invention include a cascaded, multi-level inverter, or a variant referred to as the multi-source, flying source inverter, whose ac input voltage is derived from an electromagnetic generatorator.

18 Claims, 6 Drawing Sheets

TRANSFORMERLESS MULTI-LEVEL POWER CONVERTER

BACKGROUND OF THE INVENTION

1. Field of the Invention

The present invention relates generally to power converters, and, more specifically, the present invention relates to transformerless, multi-level power converter utilizing existing generators in ship-board propulsion applications.

2. Description of the Background

The cascaded, multi-level inverter can be adapted to a variety of different applications covering a wide range of industries. This voltage source topology is advantageous compared to other topologies because of its straightforward implementation and flexibility. The cascaded, multi-level inverter can be tailored to match available input voltage levels while providing a flexible arrangement in order to obtain a required output voltage level with known harmonic distortion characteristics.

The traditional implementation of a cascaded, multi-level inverter requires the use of a dc voltage source that can be either a single source with multiple series-connected voltage levels that share a common ground connection, or multiple, isolated dc power sources. These dc voltages are typically derived from isolated transformer secondary windings connected to rectifier circuits. The size and weight of the transformer are affected by the number of isolated windings and the required power level. The number of isolated secondary windings can be significant when applied to a multi-phase, multi-level power converter. The use of these transformers is less than ideal as they add complexity and cost to the voltage source topology.

As such, there is a need in the art to provide improved cascaded, multi-level topologies that address one or more of the above-described and other limitations to prior art systems. The present invention specifically addresses a system configuration consisting of a cascaded, multi-level inverter, or a variant referred to as the multi-source, flying source inverter, whose ac input voltage is derived from an electromagnetic generator.

SUMMARY OF THE INVENTION

According to the present invention, the need to utilize the large and complex transformers can be eliminated if the cascaded, multi-level power converter is utilized in applications or systems that also contains a dedicated ac generator to supply the ac input source voltage, as would be the case for maritime applications. In this system, the inverter is typically used as a motor drive to provide variable voltage and variable frequency to a propulsion motor or other loads requiring variable frequency and voltage. The transformer can be eliminated and its function included in the generator by adding a plurality of secondary windings to supply the isolated voltages needed by the multi-level power converter.

Specifically, the present invention adapts conventional ac generators to provide the voltage sources for various inverter topologies. Two specific examples of the present invention include a cascaded, multi-level inverter, or a variant referred to as the multi-source, flying source inverter, whose ac input voltage is derived from an electromagnetic generator.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

As briefly described above, the cascaded, multi-level, voltage-clamped power converter can be found in a variety of power conversion equipment serving a variety of industries and applications. A multi-level power converter utilizes one or more dc voltage sources connected to an output load circuit through an arrangement of semiconductor switching devices (e.g., a "semiconductor switching matrix"). The semiconductor switching matrix sequentially connects the dc voltage to the load in such a manner as to cause a sinusoidal current to flow in the load circuit. This generalized arrangement commonly describes an inverter circuit that transforms a minimum of one dc voltage to a minimum of one time varying ac voltage.

Various topologies exist for the arrangement of the semiconductor switching matrix and the dc voltage source(s) that form the inverter circuit. Specifically, the preferred embodiments described herein relate to two specific inverter topologies: (a) the cascaded, multi-level voltage-clamped inverter (see generally, FIG. 1A); and (b) the multi-source, flying-source inverter (see generally, FIG. 1B). However, the concepts described according to the present invention could be adapted to a wide variety of other inverter topologies, and the scope of the present invention is not limited to the specific embodiments described herein.

Figures 1A, 1B:
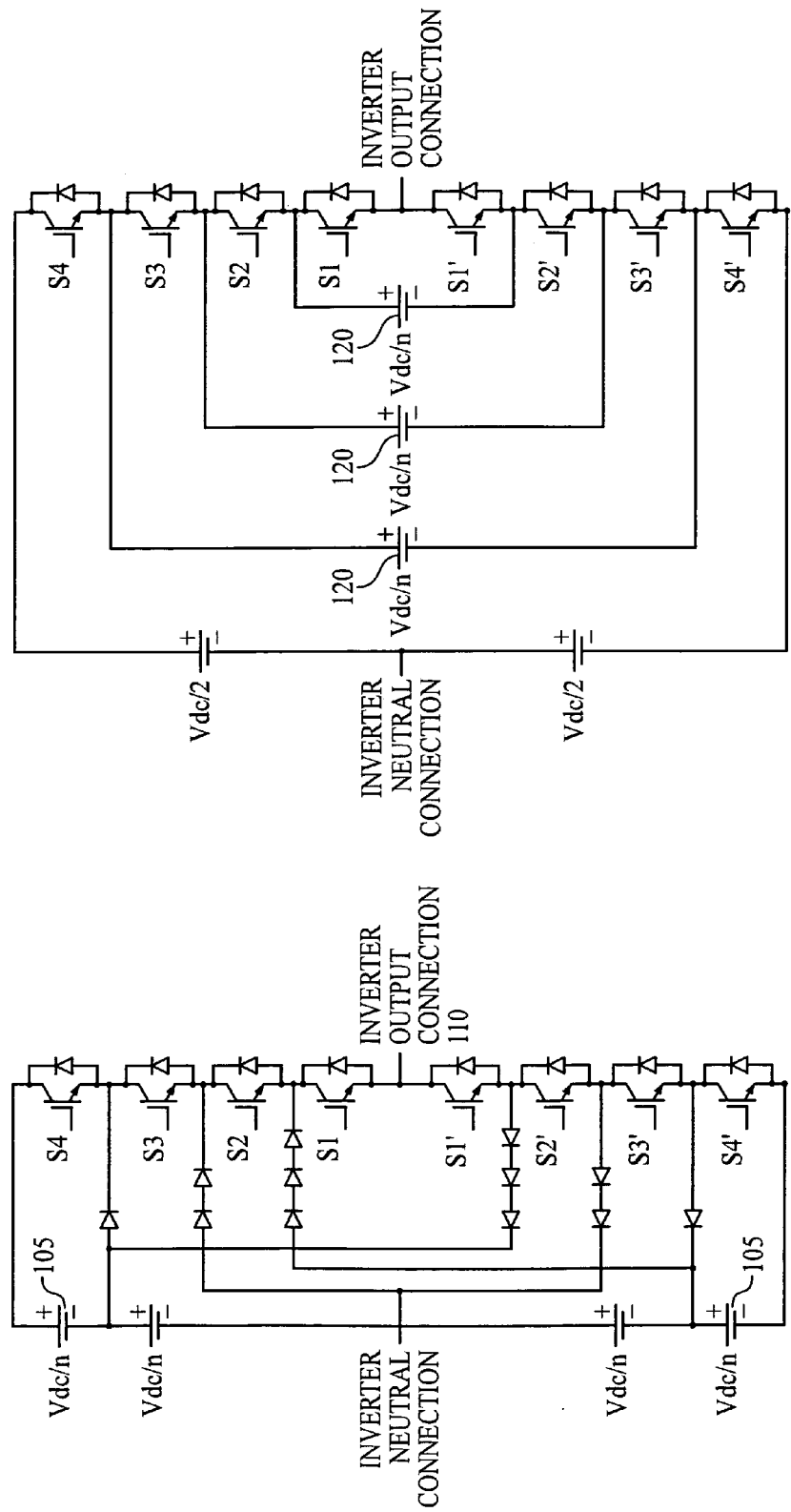
FIG. 1 details circuit diagrams of a cascaded, multi-level, voltage clamped inverter (FIG. 1A) and a flying source inverter (FIG. 1B)

An exemplary multi-level, voltage-clamped inverter circuit is shown in FIG. 1A, and an exemplary multi-source, flying source inverter is shown in FIG. 1B. Each of these inverter topologies are well known in the art, but the functionality of the circuits is generally explained below so that the description of the present invention will be better understood.

In the exemplary cascaded, mutli-level, voltage clamped inverter topology of FIG. 1A, Insulated Gate Bi-polar Transistors (IGBTs) S1-S4 and S1'-S4' are used to illustrate the active switching devices in the inverter. However, it is understood that any active semiconductor switching device can be used that has the desired operating characteristics suitable for the application. This semiconductor switching matrix is connected to multiple series connected voltage sources 105 (Vdc/n) to provide a time varying waveform to the output terminal 110. In more detail, as shown in FIG. 1A, the inverter's semiconductor switching matrix is comprised of active series-connected devices that are controlled to generate a time varying waveform composed of steps of magnitude Vdc/n, where n is the number of desired steps. These steps are then summed together at the output terminal 110 of the inverter topology to produce a higher ac resultant voltage than the respective input voltages. The operation of this inverter network is well-known in the art.

The number of steps or controllable states determines the harmonic distortion and quality of the resultant ac output waveform at the output terminal 110. As the number of output levels increases, there is a resulting lowering of the harmonic distortion and improvement in the overall waveform quality. However, an increase in the number of steps or output levels also increases the cost, size and complexity of the inverter topology itself. Therefore, a compromise must be made between the acceptable level of harmonic output distortion and the maximum tolerable number of controllable output states, based on the allowable complexity and cost of the inverter power circuit as designed. Ideally, one would like to obtain the maximum number of controllable output states by using a minimum number of voltage levels.

The derived dc voltage source(s) 105 can be either a single source with multiple series-connected voltage levels that share a common ground connection or multiple, isolated dc power sources. The number of isolated dc power sources is dictated by the desired incremental or step voltage level in the corresponding time varying output voltage waveform of the inverter.

As an additional exemplary inverter topology for use with the present invention, FIG. 1B depicts a conventional flying source inverter topology that utilizes multiple isolated dc power sources 120 to provide the multi-level dc signal to the semiconductor switching matrix. As in the case of the voltage clamped inverter of FIG. 1A, a time varying waveform comprised of steps values of magnitude Vdc/n, where n is the number of desired steps is generated at the output 125 of the inverter circuit.

Figure 2:
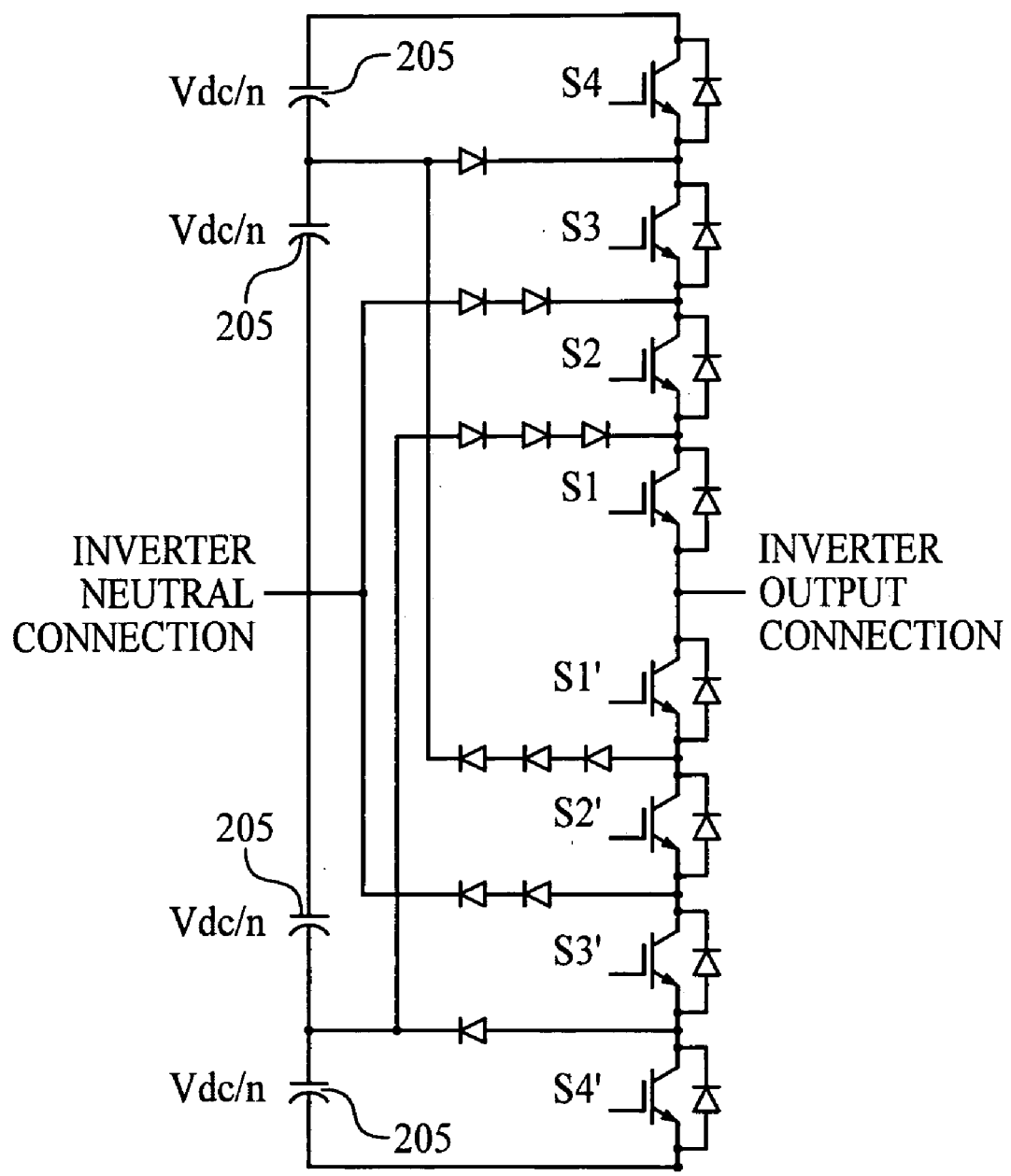
FIG. 2 details a circuit diagram of a cascaded, multi-level, voltage clamped inverter with dc capacitors.

In practice, the single or individual dc voltage steps (105, 120) are derived from a string of series-connected capacitors 205 that are connected across a single dc voltage source or multiple dc voltage sources as shown in FIG. 2. These dc voltages are produced by rectifier circuits that are fed from ac power sources of known magnitude, frequency and phase.

Figure 3A:
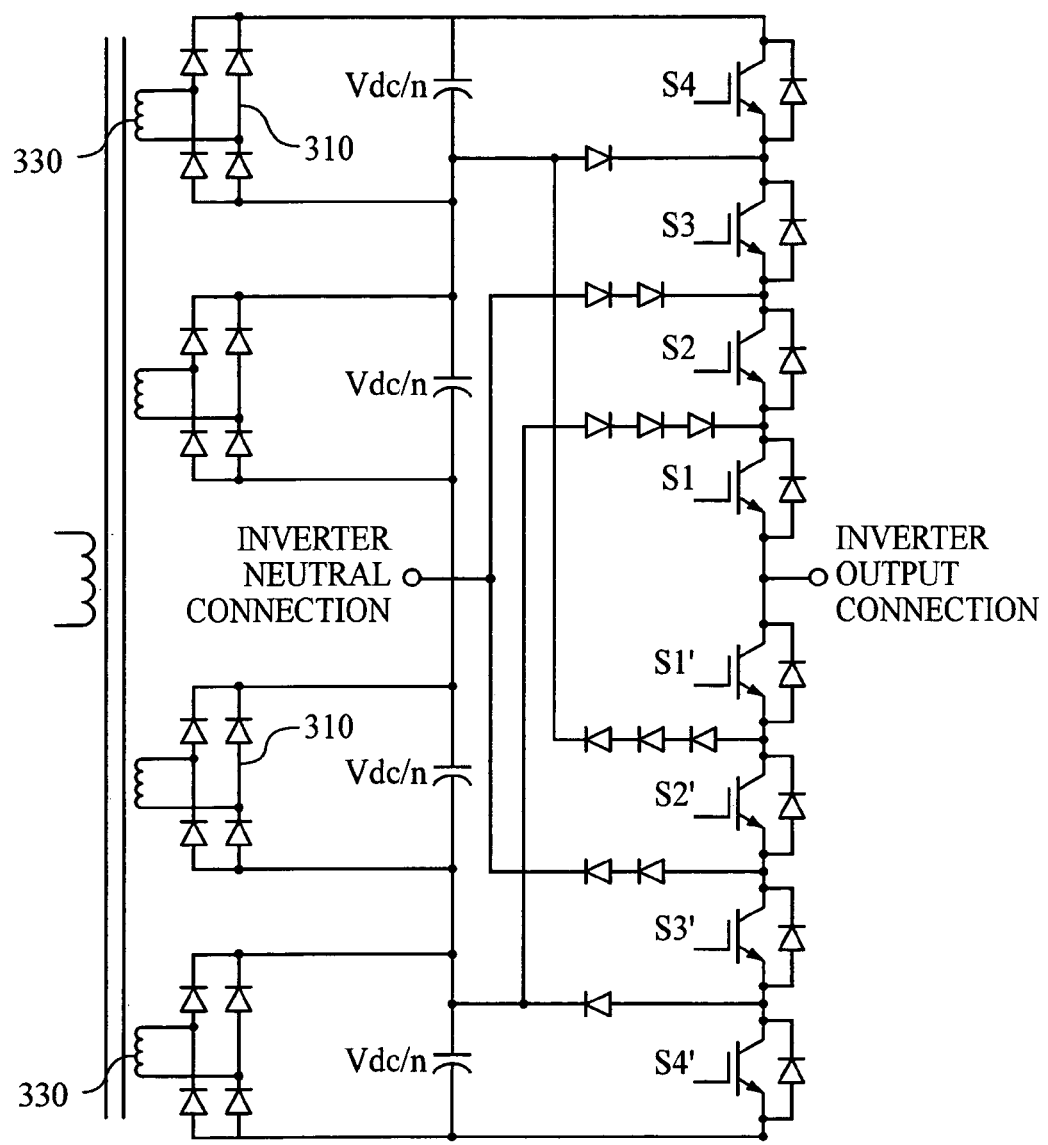
FIG. 3 details circuit diagrams of a cascaded, multi-level, voltage-clamped inverter with transformer/rectifier components (FIG. 3A) and a multi-source, flying source circuit with transformer/rectifiers (FIG. 3B)
Figure 3B:
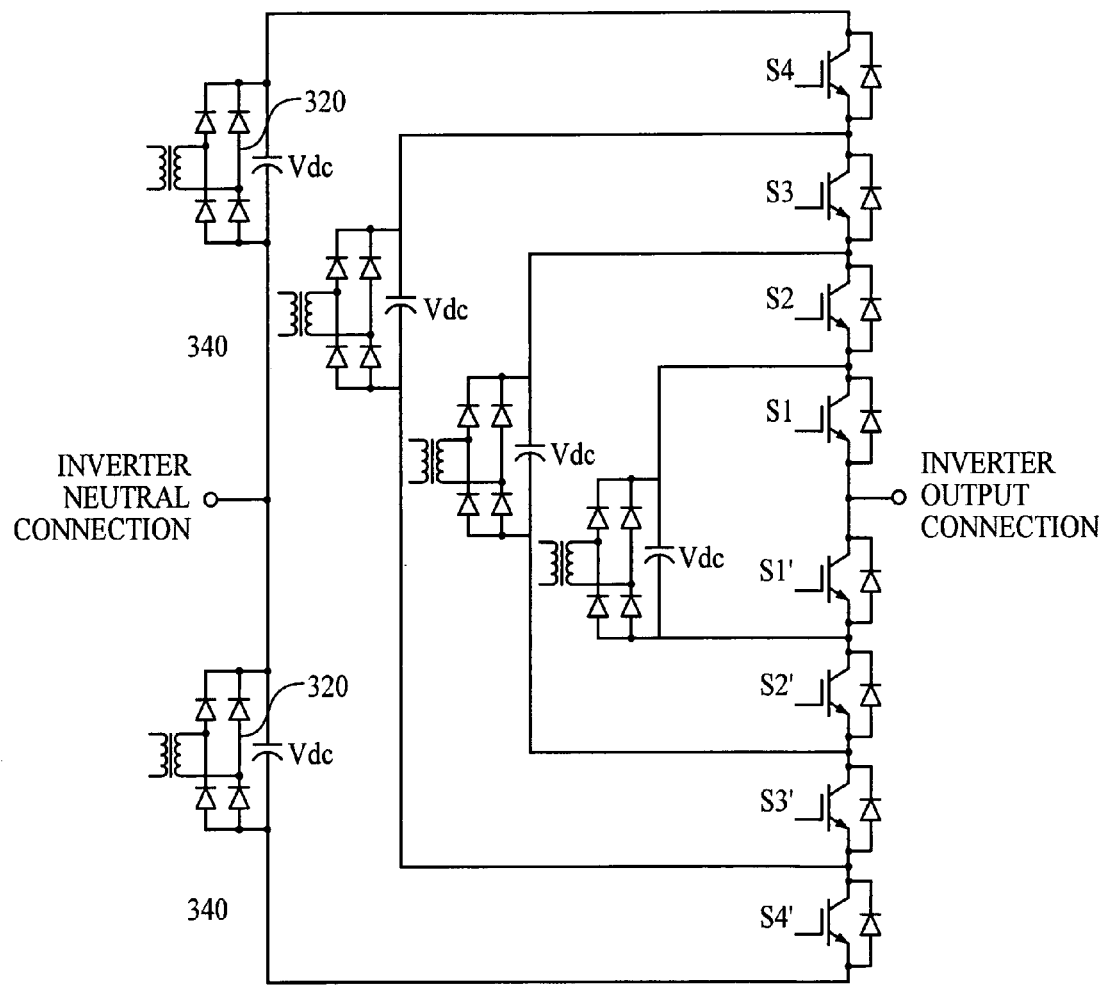

Two of these "real-world" inverter configurations are shown in FIG. 3. FIG. 3A shows a cascaded, multi-level, voltage clamped inverter with transformer/rectifiers, and FIG. 3B shows the multi-source, flying source equivalent of this inverter topology. Note that FIG. 3A tracks the voltage clamped inverter of FIG. 1A and FIG. 3B tracks the flying source inverter topology of FIG. 1B. The difference is the use of rectifier circuits 310 and 320 and transformers 330 and 340 to produce the requisite voltages.

In both cases, each dc voltage source (Vdc/n) must be regulated to provide a fixed dc voltage level to hold the desired step voltage level constant in the corresponding time varying output waveform. This is conventionally achieved through control system action (in the case of the common dc power source) or as a consequence of utilizing the transformers. The low impedance of the secondary windings acts to force a constant dc voltage across its corresponding capacitor generally independent of the current flow through the component. The derivation and control of the dc voltages are also the same for the multi-source, flying-source inverter (FIG. 3B).

According to the principles of the present invention, it has been posited that the use of a transformer to derive the secondary voltages represents an unnecessary complication to systems or applications that also include an electromagnetic generator to produce the incoming ac voltage, as would be the case for maritime applications. In these systems, the inverter topology is operated as a motor drive to provide a variable frequency and variable voltage waveform to a propulsion motor or other loads that require variable frequency and voltage. According to the present invention, the transformer is eliminated by incorporating its functionality into the generator.

Figure 4A:
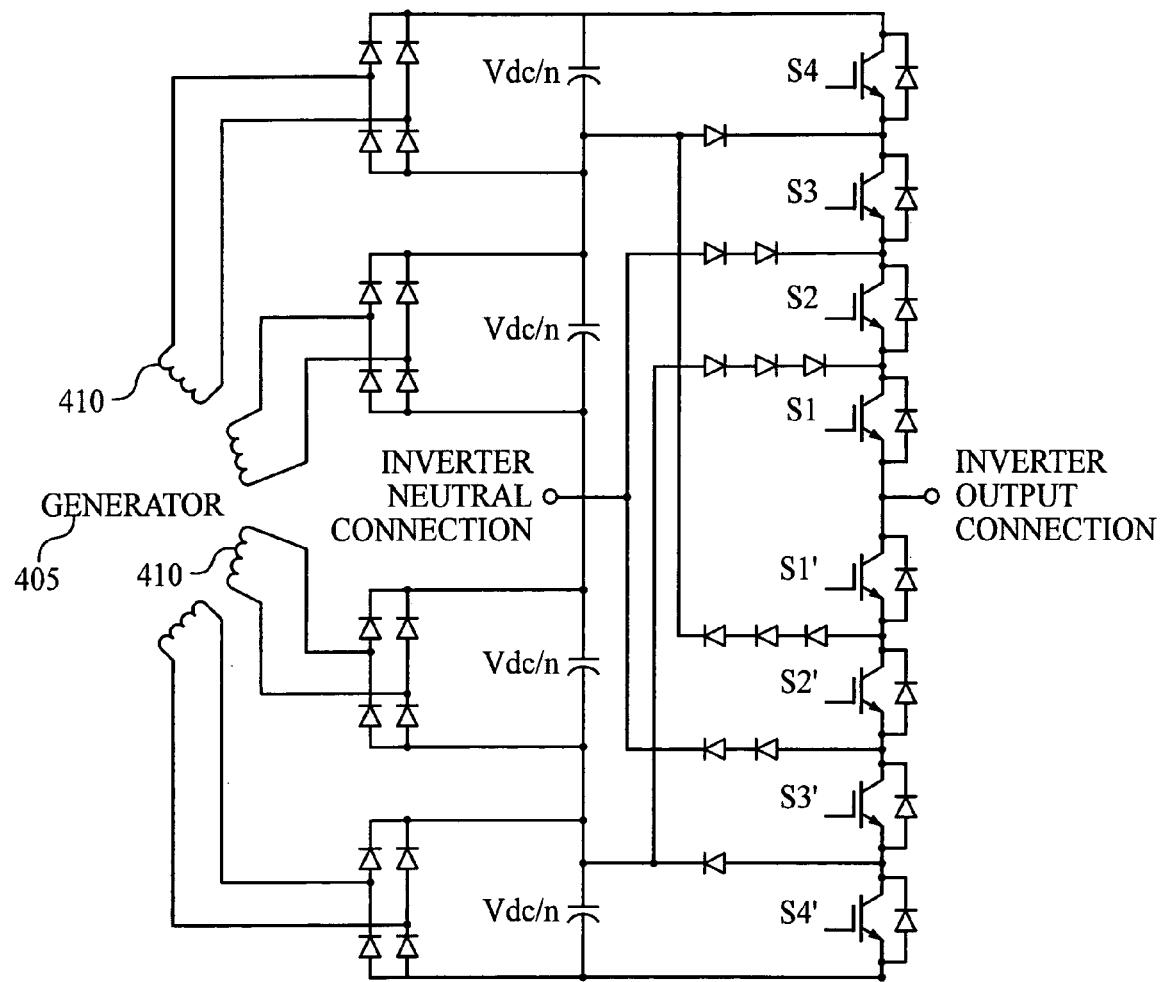
FIG. 4 details a circuit diagram of a transformerless cascaded, multi-level, voltage-clamped inverter (FIG. 4A) and a transformerless multi-source, flying source circuit with transformer/rectifiers (FIG. 4B).

In more detail, a plurality of secondary windings 410 are added to the existing generator 405 to supply the isolated ac voltages needed by the multi-level power converter as shown in FIG. 4A. The required number of secondary windings 410 are preferably selected with the proper turns ratio to supply isolated ac voltages to the individual rectifier circuits 420 of the required magnitude. The remainder of the inverter system operates according to well-established principles as described above. Thus, the need for interposing a transformer to provide these functions is eliminated with a resulting savings in weight, volume, and system complexity. These aspects of the invention are especially significant and relevant to maritime applications where weight and volume are critical and intended to be as minimal as possible.

Figure 4B:
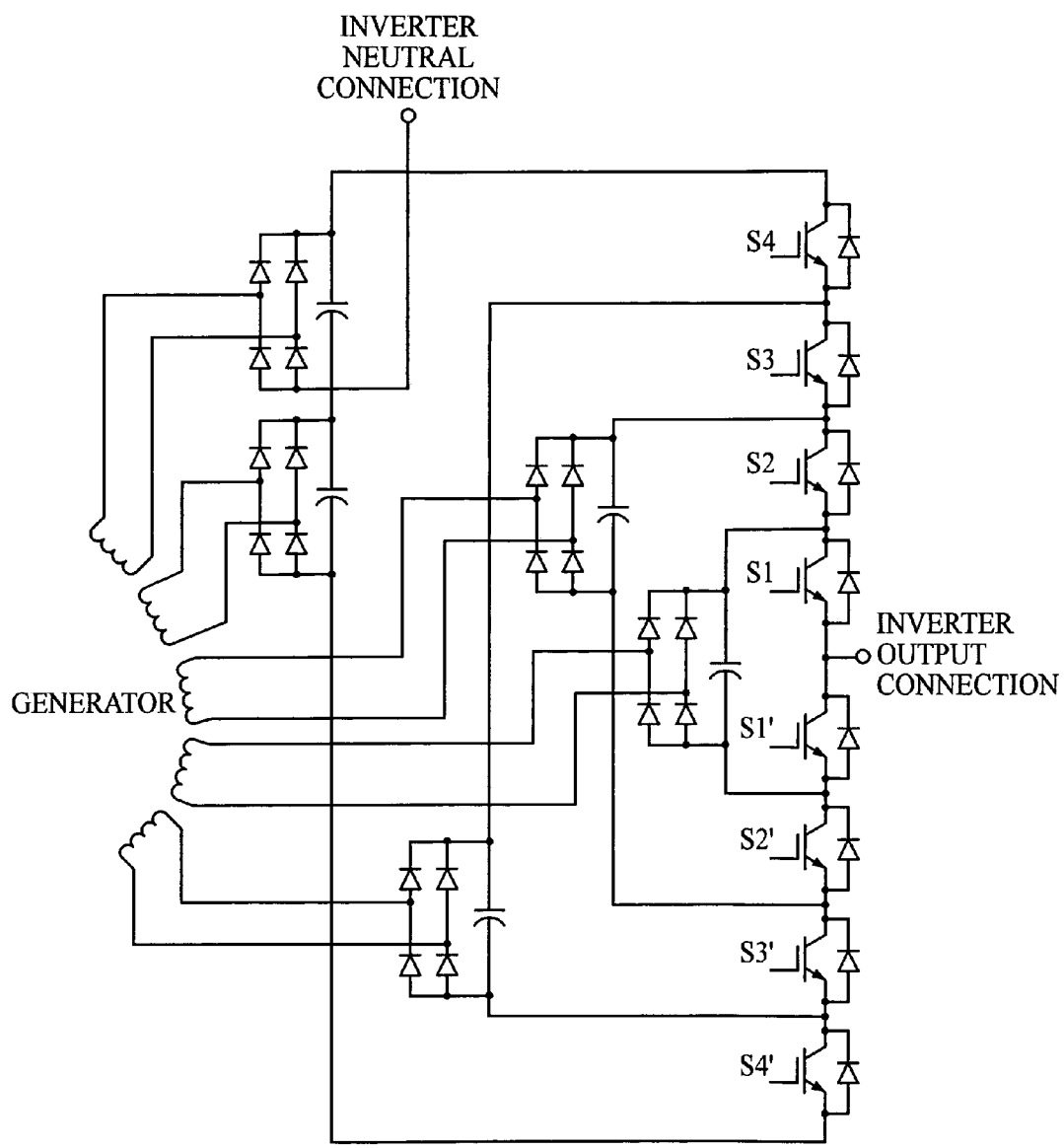

The transformerless multi-source, flying source circuit with transformer/rectifiers is shown in FIG. 4B.

The elimination of the transformers in applications or systems that utilize cascaded, multi-level voltage-clamped inverters and multi-source, flying-source inverters in conjunction with electromagnetic ac generators that supply ac input power to the inverters as to date not been proposed. By using existing components (e.g., generators) and removing unnecessary components (e.g., the transformers), the present system reduces the complexity and cost of prior art systems.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A multi-level power converter system, comprising:
   an ac generator;
   a plurality of secondary windings directly electrically connected to said generator without a separate intervening transformer between the ac generator and the secondary windings; and
   a semiconductor switching network including an output terminal attached to said plurality of secondary windings, such that the plurality of secondary windings provide dc voltage source(s) to the switching network to produce a time varying ac voltage at the output terminal, further such that a separate transformer secondary winding and rectifier are associated with each of a plurality of capacitors in series or in parallel in the semiconductor switching network.

2. The system of claim 1, wherein said system operates as a cascaded, multi-level, voltage clamped inverter.

3. The system of claim 1, wherein said system operates as a multi-source, flying source inverter.

4. The system of claim 1, wherein said system is used for maritime propulsion.

5. The system of claim 1, wherein said semiconductor switching network comprises Insulated Gate Bi-polar Transistors or other self-commutating semiconductor switching devices.

6. The system of claim 1, wherein said provided dc voltage source(s) are exactly one dc voltage source.

7. The system of claim 1, wherein said provided dc voltage source(s) are more than one dc voltage source.

8. The system of claim 1, wherein more than one time varying ac voltage is provided at said output terminal.

9. A maritime propulsion power system, comprising:
an ac generator;
a plurality of secondary windings directly electrically connected to said generator without a separate intervening transformer between the ac generator and the secondary windings;
a semiconductor switching network including an output terminal attached to said plurality of secondary windings, such that the plurality of secondary windings provide dc voltage source(s) to the switching network to produce a time varying ac voltage at the output terminal, further such that a separate transformer secondary winding and rectifier are associated with each of a plurality of capacitors in series or in parallel in the semiconductor switching network; and
a means for propulsion deriving its ac power from said output terminal.

10. The system of claim 9, wherein said system operates as a cascaded, multi-level, voltage clamped inverter.

11. The system of claim 9, wherein said system operates as a multi-source, flying source inverter.

12. The system of claim 9, wherein said system is used for maritime propulsion.

13. The system of claim 9, wherein said semiconductor switching network comprises Insulated Gate Bi-polar Transistors or other self-commutating semiconductor switching devices.

14. The system of claim 9, wherein said provided dc voltage source(s) are exactly one dc voltage source.

15. The system of claim 9, wherein said provided dc voltage source(s) are more than one dc voltage source.

16. The system of claim 9, wherein more than one time varying ac voltage is provided at said output terminal.

17. The system of claim 9, wherein said propulsion means is a ship motor.

18. The system of claim 9, wherein said propulsion means drives a submarine.

* * * * *